United States Patent [19]

Thomas

[11] 4,400,336
[45] Aug. 23, 1983

[54] METHOD OF MOLDING A HOLLOW RETAINER IN A FOAM ARTICLE

[75] Inventor: Robert D. Thomas, Sterling Heights, Mich.

[73] Assignee: General Motors Corporation, Detroit, Mich.

[21] Appl. No.: 314,251

[22] Filed: Oct. 23, 1981

[51] Int. Cl.³ .................. B29D 3/00; B29D 27/00
[52] U.S. Cl. .................. 264/46.7; 264/46.4; 264/46.9; 264/274; 264/278
[58] Field of Search .......... 264/274, 278, 46.4, 264/46.7, 46.9

[56] References Cited

U.S. PATENT DOCUMENTS

| 3,016,578 | 1/1962 | Rohe | 264/274 |
| 3,742,995 | 7/1973 | Confer et al. | 264/274 |
| 4,106,745 | 8/1978 | Carron | 264/278 |

*Primary Examiner*—James B. Lowe
*Attorney, Agent, or Firm*—Charles E. Leahy

[57] ABSTRACT

A method by which a previously molded hollow plastic retainer having an open end portion necessitated by the need to withdraw a mold core therefrom may be embedded in a molded trim article with the open end beneath the surface and yet the molding material is prevented from flowing through the open end portion and filling the hollow of the retainer. The method comprises the steps of loading the molded plastic retainer between a first mold portion having a wall extending into closure of the opening in the molded plastic retainer and a second mold portion spaced from the first mold portion to define the desired confines of the molded trim article in which the plastic retainer is to be embedded; injecting the molding material for the molding of the molded trim article into the space between the first and second mold portions; and separating the first and second mold portions after the curing of the molding material whereby the plastic retainer is embedded in the molded trim article without the flow of molding material through the open end portion to fill the desired hollow in the molded plastic retainer.

1 Claim, 4 Drawing Figures

METHOD OF MOLDING A HOLLOW RETAINER IN A FOAM ARTICLE

This invention relates to a method by which a previously molded hollow plastic retainer having an open end necessitated by the need to withdraw a mold core therefrom may be embedded beneath the surface of a molded trim article and yet the molding material is prevented from flowing through the open end and filling the hollow.

BACKGROUND OF THE INVENTION

Door trim panels in motor vehicles are conventionally comprised of a paper board base which is covered with a vinyl or cloth cover material. Apertures are provided in the paper board base for receiving the threaded head of a conventional plastic fastener. Such a fastener has a plurality of conical barbs which are pressed into apertures of the steel door inner panel to attach the trim panel to the door.

An alternate and desirable door inner trim panel construction would be the substitution of a molded foam base for the paper board base. In such a door trim panel construction the cover material would be placed in the mold and then the foam would be injected between the cover material and a mold portion spaced from the cover material at a distance providing the desired thickness of the foam base.

A disadvantage of such a molded foam base is that the foam material does not provide a suitable anchorage for the threaded head of the conventional fastener. Accordingly, it has been recognized as necessary and desirable to embed a plastic retainer in the foam base so that the fastener can be mounted on the retainer. Such a retainer is advantageously of injection molded plastic and has an opening in the face thereof through which the threaded head enters a hollow center. In order to mold such a hollow into the retainer, the retainer must be designed to have an open end through which the mold core defining the hollow may be withdrawn. According to the prior art, the retainer must have a closure member which obstructs the core withdrawal open end so that the molding material cannot fill the hollow of the retainer during the molding of the base.

The present invention provides a method by which a previously molded hollow plastic retainer may be embedded in the molded door trim panel without necessity of a closure member to block flow of molding material into the mold core withdrawal opening.

SUMMARY OF THE INVENTION

The present invention provides a method by which a previously molded hollow plastic retainer having an open end necessitated by the need to withdraw a mold core therefrom may be embedded in a molded trim article such as a door trim panel with the open end beneath the surface and yet the molding material is prevented from flowing through the open end and filling the hollow. According to this method, the previously molded plastic retainer is loaded between a first mold portion having a wall projecting into closure of the open end in the plastic retainer and a second mold portion spaced from the first mold portion to define the desired confines of the molded trim article in which the plastic retainer is to be embedded. The molding material is then injected into the space between the first and second mold portions. The first and second mold portions are separated after the curing of the molding material. The projection of the wall of the first mold portion into closure of the open end of the molded plastic retainer permits embedment of the plastic retainer in the molded trim article without the flow of molding material through the open end to fill the desired hollow in the molded plastic retainer.

The object, feature and advantage of the invention resides in the method of molding a previously molded hollow plastic retainer in a trim article via a first mold portion having a wall projecting into closure of the core withdrawal open end of the previously molded hollow plastic retainer so that the molding material cannot enter the hollow plastic retainer through the core withdrawal open end thereof.

DESCRIPTION OF THE DRAWINGS

These and other objects, features and advantages of the invention will become apparent upon consideration of the specification and the appended drawings, in which.

DESCRIPTION OF THE PREFERRED EMBODIMENT

Figure 3:
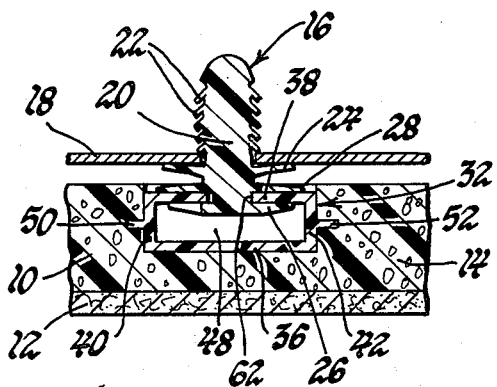
FIG. 3 is a sectional view taken through the door trim panel molded according to FIG. 1 and additionally showing a fastener installed in the molded plastic retainer.

Referring to FIG. 3, it is seen that a door trim panel 10 for a vehicle body door is comprised of a cover 12 of a decorative vinyl sheet material and a molded foam base 14. A conventional fastener 16 is provided for attaching the door trim panel 10 to a stamped sheet steel panel 18. The fastener 16 includes a shank 20 having a plurality of conical barbs 22 which are successively pushed through an aperture in the steel panel 18. A skirt 24 yieldably pushes against the panel 18 to limit insertion of the fastener 16 and to yieldably position the shank 20 such that one of the conical barbs is firmly seated against the panel to provide a firm attachment of the fastener 16 with the steel panel 18. The fastener 16 also includes a flange 28 and a threaded head 26 defined by three-quarters of a single screw thread.

Figure 2:
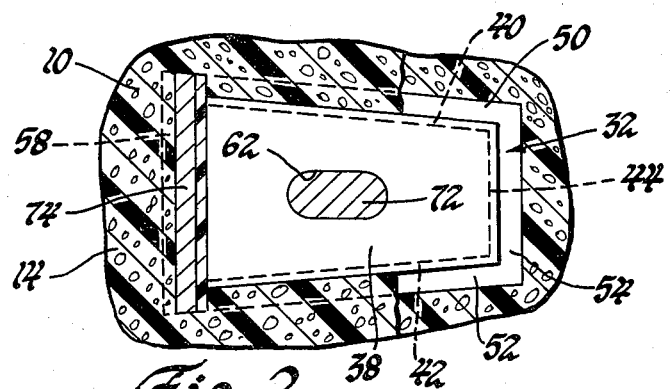
FIG. 2 is a sectional view taken in the direction of arrows 2—2 of FIG. 1.
Figure 4:
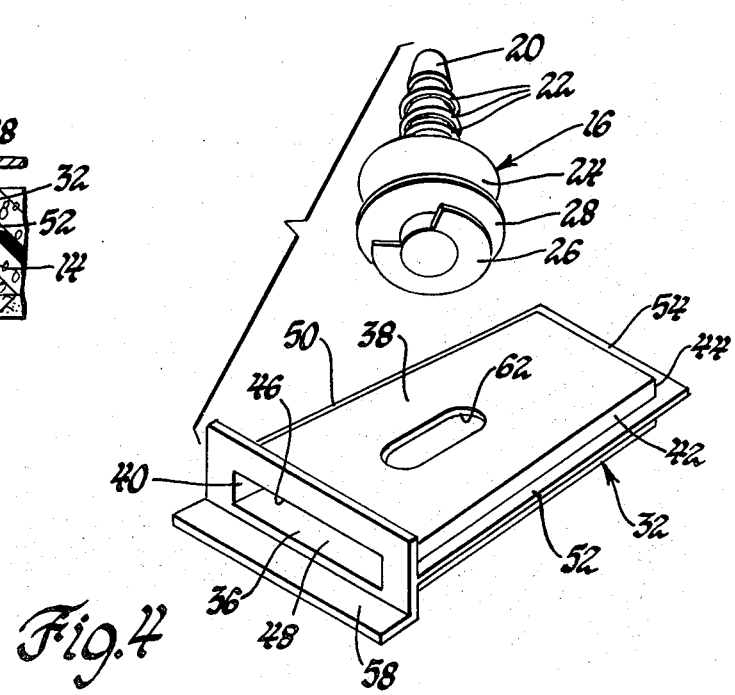
FIG. 4 is a perspective view showing the molded plastic retainer and the fastener.

A molded hollow plastic retainer 32 is adapted for embedment within the molded trim panel 10 to provide an anchorage suitable for the fastener 16. The retainer 32 includes a bottom wall 36, a top wall 38 and side walls 40 and 42. As best seen in FIGS. 2 and 4, the side walls 40 and 42 diverge from an end wall 44 toward an open end 46 to facilitate the injection molding of the retainer 32 by permitting the withdrawal of a mold core which forms a hollow 48 within the retainer. The retainer 32 also has anchoring ribs 50 and 52 which project from the side walls 40 and 42 and a rib 54 which projects from the end wall 44. Another rib 58 projects from the base wall 36 adjacent the open end 46. These ribs 50, 52, 54 and 58 are embedded in the foam base 14 to anchor the retainer 32 against pulling out of the foam base 12. The retainer 32 also has an elongated aperture 62 provided in the top wall 38. As best seen in FIGS. 3 and 4, the threaded head 26 of the fastener 16 is screwed into the slot 62 so that the fastener 16 is effectively mounted on the door trim panel 10. The length of the slot 62 permits an adjustment of the position of the fastener 16 for proper alignment with the aperture of the stamped steel panel 18.

Figure 1:
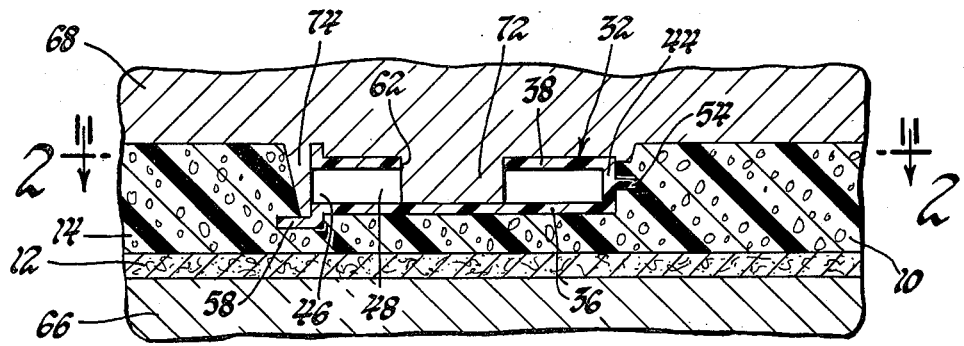
FIG. 1 is a sectional view taken through a mold employed to practice the method of embedding a previously molded hollow plastic retainer within a molded trim article.

Referring to FIG. 1 there is shown a mold apparatus for practicing the method of embedding the hollow molded plastic retainer 32 within the door trim panel 10. A lower mold portion 66 receives and supports the cover 12. The upper mold portion 68 is configured to receive and support the retainer 32. More particularly, the upper mold portion 68 has a projection 72 which extends through the slot 62 of the top wall 38 and into engagement with the bottom wall 36 to locate and support the retainer 32. The upper mold portion 68 also has a wall 74 which projects toward the lower mold portion 66 and is adapted to span the width of the open end 46 of the retainer 32 and engage with the rib 58 extending from the bottom wall 36. Accordingly, as best seen in FIG. 1, the wall 74 effectively closes the open end 46 and isolates the hollow 48 of the retainer 32 from the mold cavity defined between the lower mold portion 66 and the upper mold portion 68. The upper mold portion 68 and the lower mold portion 66 are closed relative one another at the proper spacing to define the desired thickness of the molded foam base 14. Upon the injection of the molding material between the lower mold portion 66 and the upper mold portion 68, the wall 74 will prevent the flow of mold material into the hollow 48 of the retainer 32. Accordingly, the hollow 48 of the retainer 32 is prevented from being filled with the molding material without necessity of assembling a closure member upon the retainer 32 as necessitated in the prior art.

Thus, it is seen that the invention provides a new and improved method by which a previously molded hollow plastic retainer having an open end necessitated by the need to withdraw a mold core therefrom may be embedded beneath the surface of a molded trim article and yet the molding material is prevented from flowing through the open end of the retainer and filling the hollow.

The embodiments of the invention in which an exclusive property or privilege is claimed are defined as follows:

1. A method by which a previously molded hollow plastic retainer having a top wall with an opening adapted to receive the enlarged head of a fastener and side wall structure defining an open end portion, necessitated by the need to withdraw therefrom a mold core used in previously molding the hollow plastic retainer, may be embedded in a molded trim article with the opening at the surface of the trim article and with the side wall structure and the open end portion defined thereby beneath the surface and yet the molding material is prevented from flowing through the open end portion and filling the hollow provided for receiving the head of the fastener, said method comprising the steps of:

loading the molded plastic retainer between a first mold portion having both a projection to extend into the opening to locate the retainer in the mold with the opening of the retainer at the surface of the trim article and a wall extending generally perpendicularly from the first mold portion into sealing contact with the side wall structure defining the open end portion of the molded plastic retainer and a second mold portion spaced from the first mold portion to define the desired confines of the molded trim article in which the plastic retainer is to be embedded;

injecting the molding material for the molding of the molded trim article into the space between the first and second mold portions; and separating the first and second mold portions after the curing of the molding material whereby the plastic retainer is embedded in the molded trim article without the flow of molding material through the open end portion to fill the desired hollow for receiving the head of the fastener in the molded plastic retainer.

* * * * *